(12) United States Patent
Hofmann et al.

(10) Patent No.: US 9,793,777 B2
(45) Date of Patent: Oct. 17, 2017

(54) ROTOR BEARING FOR AN ELECTRICAL MACHINE

(75) Inventors: Georg Hofmann, Mistelgau (DE); Stefan Sadel, Buttenheim (DE); Johannes Dennerlein, Weilersbach (DE); Erich Russ, Gremsdorf (DE)

(73) Assignee: IMO Holding GmbH, Gremsdorf (DE)

( * ) Notice: Subject to any disclaimer, the term of this patent is extended or adjusted under 35 U.S.C. 154(b) by 0 days.

(21) Appl. No.: 13/983,458

(22) PCT Filed: Jan. 30, 2012

(86) PCT No.: PCT/EP2012/000391
§ 371 (c)(1),
(2), (4) Date: Jan. 6, 2014

(87) PCT Pub. No.: WO2012/104050
PCT Pub. Date: Aug. 9, 2012

(65) Prior Publication Data
US 2014/0125064 A1    May 8, 2014

(30) Foreign Application Priority Data

Feb. 4, 2011  (DE) .......................... 10 2011 011 164

(51) Int. Cl.
*H02K 7/18* (2006.01)
*H02K 7/09* (2006.01)
(Continued)

(52) U.S. Cl.
CPC ................ *H02K 7/09* (2013.01); *F03D 9/25* (2016.05); *H02K 7/083* (2013.01); *H02K 7/116* (2013.01);
(Continued)

(58) Field of Classification Search
None
See application file for complete search history.

(56) References Cited

U.S. PATENT DOCUMENTS 6,564,664 B1 * 5/2003 Battlogg ................... 74/388 PS
8,647,224 B2 * 2/2014 Paweletz et al. ............. 475/149
(Continued)

FOREIGN PATENT DOCUMENTS

DE    102004021138    11/2005
DE    102007037842     4/2008
(Continued)

*Primary Examiner* — Erin D Bishop
(74) *Attorney, Agent, or Firm* — Pandiscio & Pandiscio

(57) ABSTRACT

A disk armature generator for generating electrical energy from rotational energy of a wind power installation and comprising at least two stator components mutually offset axially along a generally horizontal rotation axis of the disk armature, and comprising, mounted therebetween so as to rotate about the rotation axis, at least one ring- or disk-shaped rotor component of the disk armature, and comprising an input-side connection for a gearbox wherein the sun gear thereof, which extends coaxially with the rotation axis of the disk armature, is coupled to at least one ring- or disk-shaped rotor component of the disk armature, wherein a rolling bearing associated with a ring- or disk-shaped rotor component of the disk armature is configured as a selected one of an angular contact ball bearing and angular contact ball bearings, having a contact angle of between 40° and 50° relative to the rotation axis, comprising a double-row angular contact ball bearing in an O arrangement.

12 Claims, 7 Drawing Sheets

(51) Int. Cl.
*H02K 7/08* (2006.01)
*H02K 7/116* (2006.01)
*H02K 21/24* (2006.01)
*F03D 9/25* (2016.01)
*F16C 19/54* (2006.01)

(52) U.S. Cl.
CPC .......... *H02K 7/1838* (2013.01); *H02K 21/24* (2013.01); *F16C 19/54* (2013.01); *F16C 2380/26* (2013.01); *Y02E 10/725* (2013.01)

(56) References Cited

U.S. PATENT DOCUMENTS

| | | |
|---|---|---|
| 2007/0217724 A1 | 9/2007 | Verhoeven |
| 2009/0025991 A1* | 1/2009 | Moriguchi ............. F16D 55/02 180/65.51 |
| 2010/0062888 A1* | 3/2010 | Ciszak et al. .................. 475/31 |
| 2010/0225112 A1 | 9/2010 | Hayakawa |

FOREIGN PATENT DOCUMENTS

| | | | |
|---|---|---|---|
| EP | 2063114 | | 5/2009 |
| WO | WO02057624 | | 7/2002 |
| WO | WO2010/069449 | * | 6/2010 |

* cited by examiner

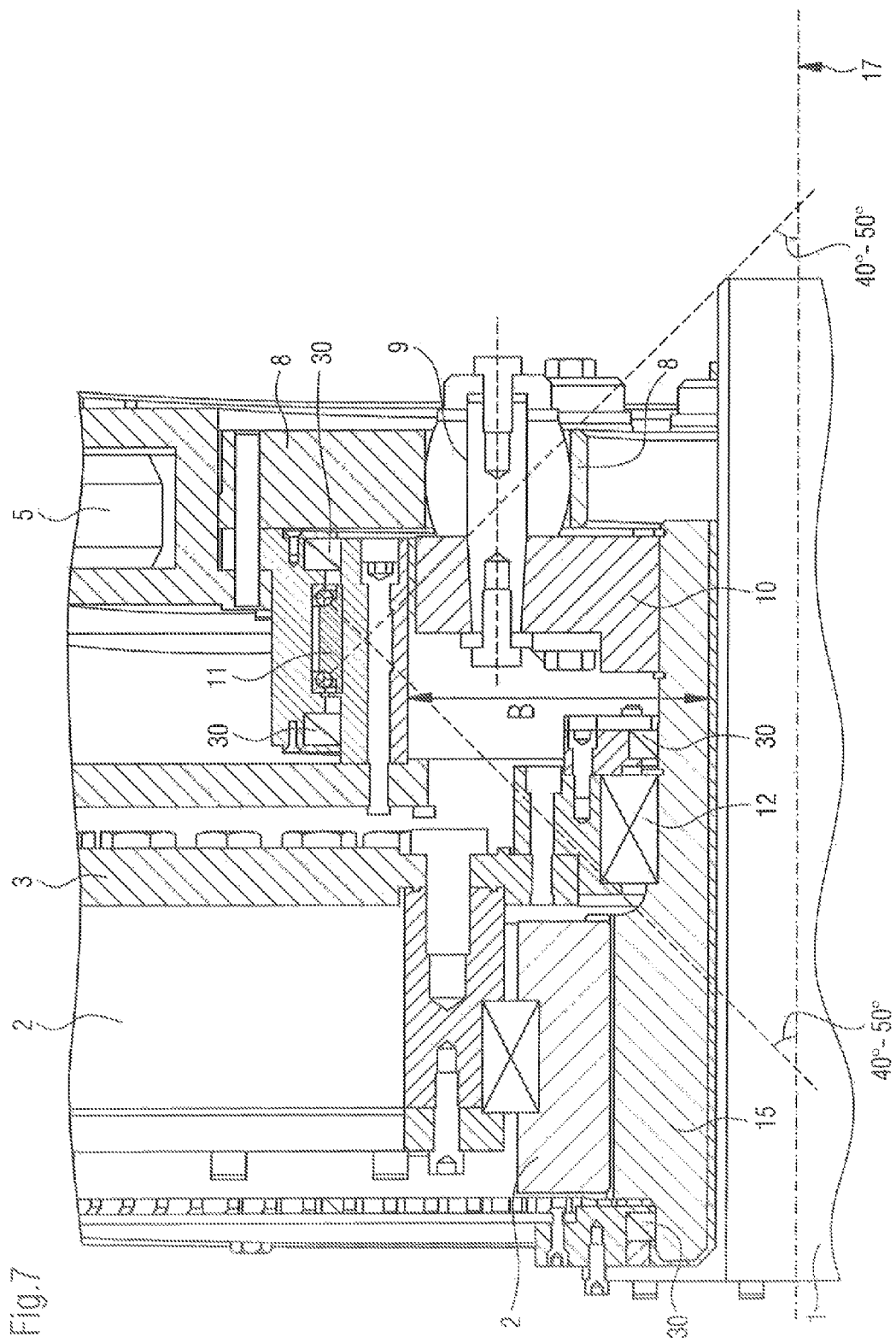

ROTOR BEARING FOR AN ELECTRICAL MACHINE

BACKGROUND OF THE INVENTION

1. Field of the Invention

The invention is directed to a rotor bearing for an electrical machine, particularly to a disk armature generator for generating electrical energy from the rotational energy of a power installation driven in rotation, preferably a turbine power installation, particularly a wind power installation, comprising at least two stator components that are mutually offset axially along a generally horizontal rotation axis of a disk armature, and comprising, mounted therebetween on a single rolling bearing so as to rotate about the rotation axis, at least one ring- or disk-shaped rotor component of the disk armature, and to a wind power installation equipped in such manner.

2. Description of the Prior Art

Rotating installation parts and machine parts are often mounted by means of rolling bearings. For example, in unexamined German patent application DE 10 2004 021 138 A1 there is described an electrical machine and its mounting in which the fixed bearing is implemented as two deep groove ball bearings. In this type of design, the rotatable shaft is mounted at two different points, on a so-called "fixed bearing" and a so-called "loose bearing". However, a multiple bearing of this kind is a relatively expensive way to deal with large rotating masses, since in such cases the rolling bearings must be of correspondingly massive construction and are therefore cost-intensive to design and build.

Particularly, in a wind power installation, the shaft driven by the wind energy, which shaft is oriented along the main rotor axis, should be mounted to ensure that operation is as frictionless as possible, so that the energy extracted from the motive force of the wind can be transferred and converted with the lowest possible losses.

Thus, for example, unexamined patent application DE 10 2009 004 991 A1 addresses the mounting of the rotor of a wind power installation whose rotor points approximately in the wind direction. The proposed mounting includes at least two annular, mutually concentric elements for connection to oppositely rotatable system components of the wind power installation, specifically to its rotor or to the output shaft of a gearbox coupled thereto, on the one hand, and to the chassis of the nacelle, on the other hand. The force of the wind preferably drives, via a gear stage, a shaft that is coupled to other components at the output end.

The problem of mounting a rotating shaft also arises in the context of electrical machines used to convert rotational energy into electrical energy.

Thus, for example, DE 10 2007 037 842 A1 discloses an electrical machine in the category of a centrally mounted disk armature, configured as a disk armature having a stator and a disk-shaped rotor. The stator in this case comprises at least one disk-shaped stator part disposed on a holder and spaced apart from the rotor in the axial direction so as to interact magnetically with the rotor across an air gap, wherein the rotor is mounted on a holder rotatably about its own rotation axis. For connection on the input side, the generator has an input shaft, but the only way to connect this input shaft to the output shaft of a gearbox, or the like, is by butt flanging. Such a shaft connection makes it impossible to position the generator and a gear, or the like, closer together, since the shaft connection would then be inaccessible. Since space is at a premium, particularly in wind power installations, such a generator cannot be used advantageously in such facilities.

SUMMARY OF THE INVENTION

From the disadvantages of the prior art comes the problem initiating the invention: to create a space-saving arrangement for the generator of a wind power installation that permits drive-side coupling to a gear stage and conversion of the rotational energy into electrical energy with the lowest possible losses.

This problem is solved by means of a disk armature generator for generating electrical energy from the rotational energy of a power installation that is driven in rotation, preferably a turbine power installation, particularly a wind power installation, comprising at least two stator components that are mutually offset axially along an approximately horizontal rotation axis of the disk armature, and comprising, mounted therebetween so as to rotate about the rotation axis, at least one ring- or disk-shaped rotor component of the disk armature, comprising an input-side connection for a gearbox, preferably a step-up gearbox, particularly a planetary gearbox, wherein the output shaft thereof, particularly the sun gear thereof, which extends coaxially with the rotation axis of the disk armature, is coupled to at least one ring- or disk-shaped rotor component of the disk armature, wherein the rolling bearing associated with a ring- or disk-shaped rotor component of the disk armature is configured as an angular contact ball bearing or with angular contact ball bearings, for example, having a contact angle of between 40° and 50° relative to the rotation axis, preferably as a double-row angular contact ball bearing, and particularly as a double-row angular contact ball bearing in an O arrangement.

Bearings of this kind have proven entirely suitable for exactly guiding the rotating disk armature, even despite considerable magnetic forces, i.e., for absorbing and diverting any tilting moments that may occur, without allowing the disk armature to change its position or orientation in space, particularly in such a way that the air gaps between the magnetic rotor and the stator windings interlinked with it vary appreciably.

To mount the rotor of an electrical machine at two mutually offset bearing locations between which said rotor is located, a respective rolling bearing can be present at each of these two bearing locations, i.e., separated from each other by a length L in the longitudinal direction of the rotor rotation axis. In such a case, with reference to a wind power installation, one of these bearings is mounted on the gearbox side, i.e., facing the hub of the wind rotor, whereas the other one of these bearings in such a case would be mounted on the tower side; the rotor element of the electrical machine rotates between the two bearings as soon as the shaft is driven. The mounting for the electrical machine in this case is not necessarily the same as the mounting for the driven shaft. Such a two-part bearing must be dimensioned in such cases so that the bearings are not statically destroyed by the magnetic force developed during the operation of the energy machine.

This also applies to an arrangement with only one bearing location: in that case, as well, the mounting for the rotor of the generator must be designed so that the entire generator assembly can absorb the loads from the magnetic action produced by the operation of the generator without any appreciable deformation of the rotor mounting due to the resulting magnetic forces. At the same time, the generator assembly, according to the invention, lends itself to extremely space-saving construction and can be an extremely compact unit. The number of components required for this purpose can be reduced; in addition, the components can be extremely easily accessible for corrections, repairs, retrofits. The mounting of the disk armature can be designed to allow easy access for servicing. The components, particularly the disk armature, should be as easy and quick to install as possible, in order to minimize the installation and servicing times that installers and service technicians have to spend in the wind power installation.

The invention can be developed further in that a ring- or disk-shaped rotor component of the generator has only one mounting, particularly a rolling bearing. The electrical machine has, as a disk armature, one or more ring- or disk-shaped rotor component(s), particularly one or more rotor disk(s), which during operation move(s) rotationally between respective first and second stator components; this is (these are each) mounted rotatably about the main rotor axis by means of a single mounting, particularly a rolling bearing.

A single bearing, particularly a double-row angular contact ball bearing, is sufficient to absorb the weight of the mounted and rotating electrical machine disk(s) and the tilting moment caused by it (or each of them).

If only one rotating electrical machine disk is used, then only a single rolling bearing is necessary, particularly a double-row angular-contact ball bearing. Due to the saving in space obtained by eliminating the second bearing, the entire assembly is space-optimized and more compact than the previous art. Also, fewer parts are needed owing to the elimination of the second bearing location. This also leads to cost savings.

Eliminating one bearing location per rotor disk makes it possible to save on both material and space, and the number of rotary connections is reduced. This reduces the complexity of installation and facilitates access to the gearbox-side bearing, which is especially important, particularly in the case of wind power installations, since the components of the generator assembly can be accessed only from the tower side during operation.

It is further advantageous that there are only a few locations that must be sealed against escaping media such as, for example, oil, lubricant or grease. This yields the further advantage that an installation according to the invention has fewer seal locations than has been the case in the prior art.

As is known, seal locations are often weak points in rotating and long-life installations, since leakage can occur if the sealing elements of rotary connections and/or bearings are untight. Leaks in rotary connections lead, for example, to premature loss of lubricant, hence to less lubrication than is necessary and thus, often, to bearing damage. The service life of an installation generally decreases if the bearings are damaged. If fewer seal locations are present overall, this also means fewer locations that are susceptible to defects or failure.

By virtue of the arrangement according to the invention, particularly by virtue of the design of the bearing, and the fact that the shaft transporting the rotational energy passes through the bearing, many elements of the arrangement are easily accessible from the tower side. In particular, it is possible for service technicians to replace the existing tower-side seals during routine-length maintenance visits without having to remove a bearing to do so. A major additional advantage of using only one bearing for mounting the rotating electrical machine disk is that there is no need to adjust several different bearings against one another. This saves time on service and installation.

In a preferred embodiment of the invention, only one rotor disk rotates between two stator components. However, it is conceivable without further measures for the generator to include a plurality of such assemblies, each composed of a respective pair of stator components and a rotor disposed therebetween, for example in order to increase the rated power of the generator. Of course, the assembly, as a whole, would then take on larger dimensions in the longitudinal direction of the rotation axis. Each ring- or disk-shaped rotor component would then preferably be mounted rotatably about the main rotor axis on its own rolling bearing. In a further preferred configuration, each rolling bearing in such an arrangement would be a double-row angular contact ball bearing.

The invention further provides that a rolling bearing that supports at least one ring- or disk-shaped rotor component rotatably about the main rotor axis is implemented such that it is fixed to a support structure of the generator. In the preferred embodiment, it is bolted directly to the generator housing, or fixedly connected to another fixed element of the generator support. In this case, this first rolling bearing is always the only bearing in the wind power installation that supports a respective rotating rotor component of the electrical generator.

Further advantages are gained if the inner ring diameter of the rolling bearing is greater by a distance B than the outer diameter of an innermost hollow shaft or sleeve that passes through the gearbox and/or the generator, and/or is greater by a distance C than the outer diameter of the output shaft of the gearbox. In this way, the generator disk can be configured as ring-shaped, rather than disk-shaped, thus saving on material, and the first rolling bearing can be mounted as close as possible to the stator components between which the rotor disk moves in rotation. This, in turn, means less tilting moment from the mounted rotor disk, as well as more bearing surface area there, i.e., more stable or uniform mounting of the mounted disk, due to the larger diameter of the first rolling bearing.

In a preferred embodiment of the invention, the distance B, and/or the distance C, is approximately between 20 and 30 cm. However, these distances B, C to the innermost hollow shaft, or the output shaft of the gearbox, can also be selected as smaller, for example, approximately only 1 cm or more, or up to 5 cm greater than that distance, or at least 30 cm, or at least 50 cm greater than that distance. If the bearing is to be still more robustly implemented, or if very large rotor disks are to be supported, then it may be expedient to choose a distance B and/or C of more than 50 cm and much greater, for example of 100 cm or more.

At least one ring- or disk-shaped rotor component of the generator is connected to one or more elements that are directly or indirectly connected to the shaft and are arranged rotatably about the main axis. This connection can take the form of massive screw connections; however, any other common type of massive, rotationally fixed form-locking or force-locking connections would be conceivable.

Assuming the distances B, C specified above, it has proven particularly advantageous if the coupling device between the gear output shaft and/or the generator input shaft, on the one hand, and a ring- or disk-shaped rotor element comprises at least one coupling disk and/or at least one shaft ring. It is then contemplated that the rotation of the shaft be transmitted to, for example, a shaft ring, which is form-lockingly connected to the gear output shaft and rotates along with the latter about the main rotor axis. At the same time, however, this shaft ring is also form-lockingly connected to the coupled-on coupling disk. Both elements, the shaft ring and the coupling disk, rotate about the main rotor axis during operation and are coupled in a rotationally fixed manner to at least one or more connection element(s).

According to a preferred embodiment of the invention, the coupling of at least one ring- or disk-shaped rotor component of the disk armature to the gearbox is implemented, not as rigid, but by means of at least one preferably elastic force transmission device disposed inside the generator so as to be able to rotate about the rotation axis thereof.

Further advantages are gained by coupling at least one rotor disk of the generator to one or more coupling and/or damping elements arranged rotatably about the main axis. Such an arrangement according to the invention ensures that the axial loads from the magnet are advantageously distributed symmetrically, and that exact rotation of the shaft is possible and no tilting occurs, since no tilting moment is developed.

In a configuration of this kind, the connection elements can be designed as elongated coupling elements oriented parallel to the main rotor axis, each positioned about the main axis—for example, distributed annularly about the main rotor axis—and in particular can serve as massive connectors, for instance as screws or bolts. For damping purposes, or also for tolerance equalization during installation and, where appropriate, for purposes of more uniform force transmission, these connectors can be implemented in elastic material, particularly consisting of elastomer-like or vulcanized-rubber-like or synthetic-rubber-like material. Alternatively—as, for example, in the most advantageous embodiment—they can also consist of massive, metallic material, or also of optimized hollow profile members that are sheathed in softer material for damping purposes.

It is further within the teaching of the invention that in the case of a power installation with a planetary gearbox and the sun gear centrally mounted therein, the gear output shaft and the sun gear are coupled to each other in a rotationally fixed manner, or alternatively, form a single, common part.

The mounting for the gear output shaft preferably is not located inside the gearbox itself, but instead in the generator according to the invention, or at least in the transitional region between the gearbox and the generator. That way, the full thickness of the planetary gears can be used for tooth engagement with the toothed region of the sun gear. The latter has an axial prolongation that extends into the generator and is mounted there.

For this mounting, the invention also prefers one or more angular contact ball bearings, preferably a double-row angular contact ball bearing. It is not mandatory, of course, that just one double-row angular contact ball bearing be provided; for example, two, for example single-row, angular contact ball bearings could be used instead.

This bearing is preferably directly mechanically coupled to a shaft driven from the gear side or to a shaft that drives the generator. It should be noted that the bearing in question here is not the rolling bearing mentioned earlier hereinabove, but another rolling bearing. This second rolling bearing is coupled to the chassis, the housing of the nacelle or gondola, or the housing of the gearbox or generator, or to another part fixedly attached thereto. This can be done, for example, by directly screwing or connecting the rolling bearing to the part concerned, for example to a stationary part of the gearbox; in the preferred embodiment of the invention, this second rolling bearing is screwed to the housing and/or to the planet gear carrier of a planetary gear driven by the rotor via a ring gear. In a preferred configuration of the invention, a plurality of planetary gears is mounted to this planet gear carrier. In the latter case, the stationary part of the gearbox and/or of the planet gear carrier of a planetary gearbox should be fixedly coupled or screwed to the tower or the tower side of the wind power installation.

The invention further provides for equipping a wind power installation with a gearbox and a disk armature generator. In this case, the wind wheel is set in rotation by wind energy which serves as the drive source. From the hub of the wind wheel, the rotational energy extracted from the wind is transmitted to a rotatable ring of the main rotor bearing. The outer ring of the latter is preferably fixed to the tower of the wind power installation, whereas the hub is connected, for example screwed, to its inner ring. In the preferred configuration of the invention, this simultaneously forms the ring gear of a connected planetary gearbox and drives a plurality of gear elements, for example, planetary gear wheels. This drive energy is passed along the shaft toward the main axis according to the principle of gearing. In the most advantageous configuration of the invention, this shaft is integrated with, or connected to, the sun gear of the gearbox. The axis of the sun gear and the main rotor axis therefore coincide.

BRIEF DESCRIPTION OF THE DRAWINGS

Further features, details, advantages and effects based on the invention will emerge from the following description of some preferred embodiments of the invention and by reference to the drawings, wherein:

FIG. 7 shows detail V from FIG. 4, with the section plane rotated in the plane of the drawing.

DESCRIPTION OF THE PREFERRED EMBODIMENTS

Figure 1:
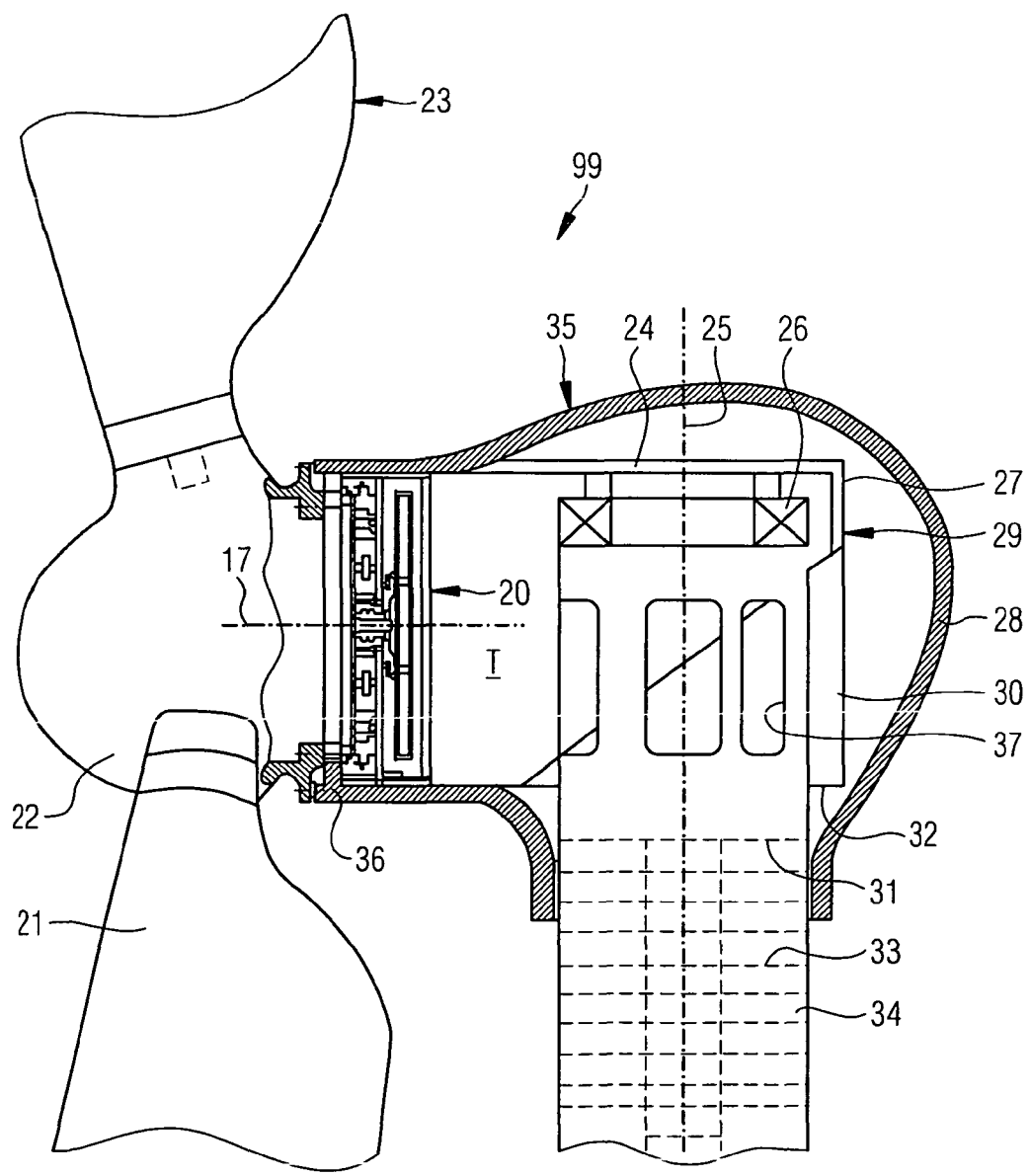
FIG. 1 is a vertical section through the nacelle of a wind power installation along the main axis of the rotor, with the tower and the wind wheel shown broken away.
Figure 2:
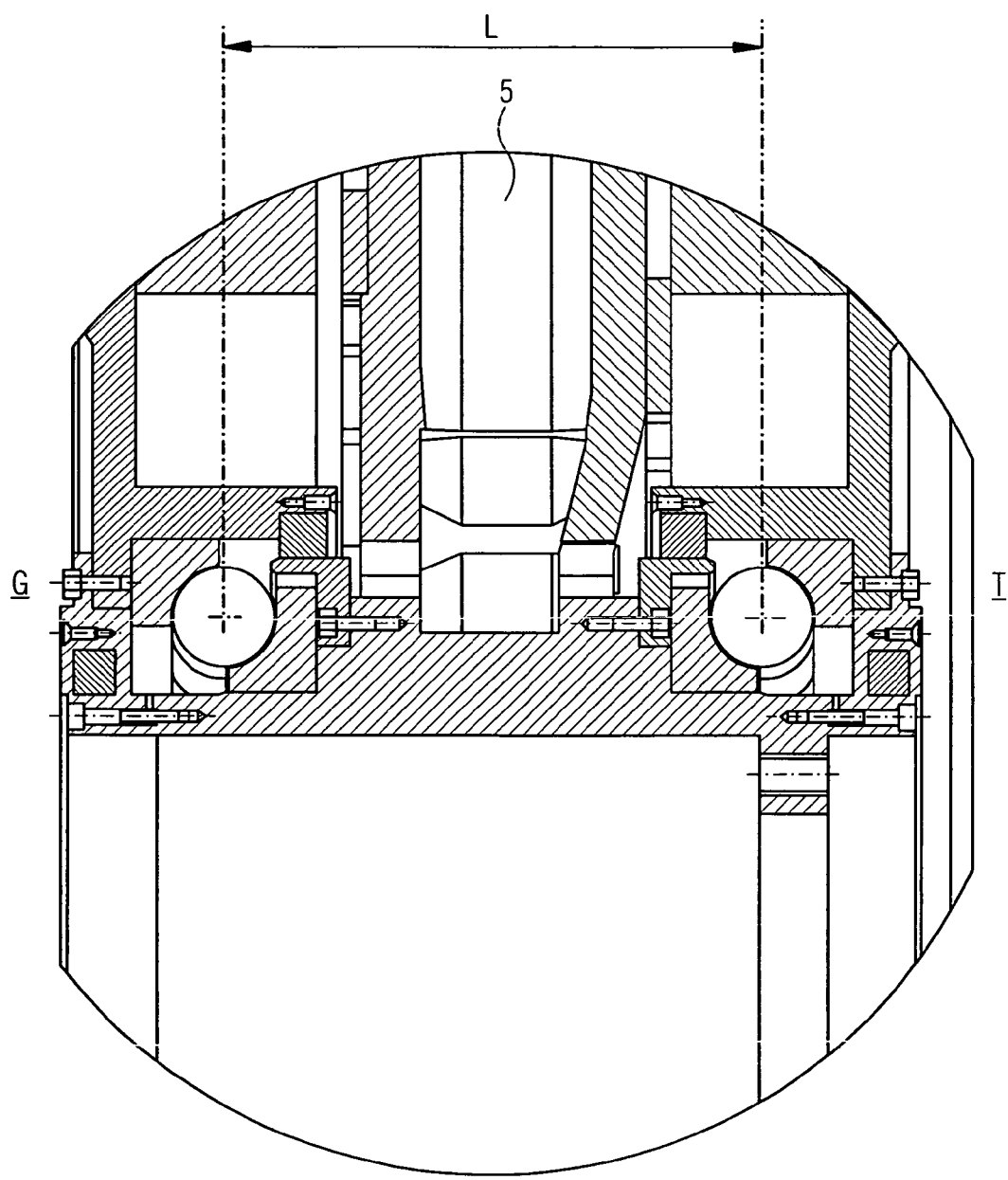
FIG. 2 shows an enlarged detail from FIG. 1, with an exemplary mounting of the generator rotor.
Figure 3:
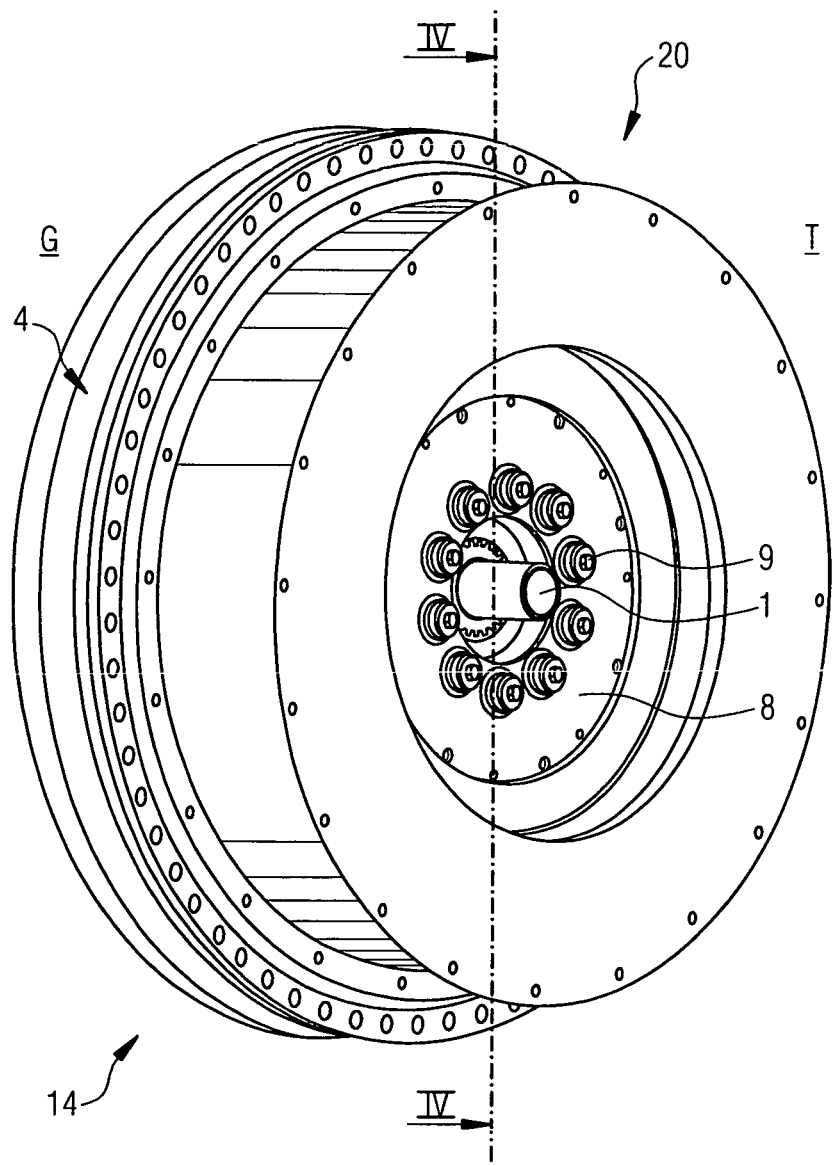
FIG. 3 shows an overall assembly according to the invention, with the generator and the gearbox integrated therein, in perspective view.

FIG. 1 illustrates the structure of a gondola 35 of a wind power installation 99 suitable for the use of a disk armature generator according to the invention.

The drawing shows the top end of a tower 34, of circular cross section, on which the gondola 35 is mounted swivelably about a vertical tower axis 25, to effect yaw adjustment, by means of a nacelle bearing 26 installed in a horizontally lying position. Whereas one ring of this nacelle bearing 26 is fixed to the top side of the tower 34, the other ring can be swiveled about the tower axis 25 by means of a drive (not shown).

Supported on the swivelable ring of the nacelle bearing 26 is a top plate or a frame 24 of a support structure 29 that is able to pivot about the tower axis 25. This support structure 29 forms the inner sleeve of the nacelle 35 and can be reached by maintenance personnel via an elevator, a ladder 33, or a staircase in the tower 34, and through lateral hatch openings 37 in the wall of the tower 34.

The inner sleeve or support structure 29 can have a back wall 27, a base plate 32 with an opening for the tower 34, and lateral wall plates, which connect the base plate 32, the back wall 27 and the top plate or frame 24 to one another, and thus serve to impart sufficient rigidity to the support structure 29. At their respective opposite sides from the back wall 27, the base plate 32, the lateral wall plates and the top plate, or frame, 24 are prolonged to an approximately circular mouth region 36.

The entire space inside the support structure 29, behind the mouth 36, is surrounded externally by a fairing 28, which, for aerodynamic reasons, has a gently curved shape and is designed to keep wind and weather out of the interior.

Located in front of the mouth 36 is a wind wheel 23 per se, which has another degree of freedom of movement, in addition to the yaw rotation of the gondola 35 and the tower shaft 25, specifically that of rotation about a second axis, the so-called main rotor axis 17, which extends in an approximately horizontal direction away from the tower axis 25 in the region of the gondola 35. The wind wheel 23, for its part, comprises a hub 22, from which a plurality of vanes or blades 21 extend in approximately radial directions with respect to the main rotor axis 17, and which, via blade bearings, can be mounted to the hub 22 rotatably about their longitudinal axis.

The rotatable mounting of the hub 22 about the main rotor axis 17 and the capture of the rotational energy can be effected by means of an assembly 20 that can include a number of functional units, specifically a main or rotor bearing 4 per se, a gearbox 13, particularly a step-up gearbox, and a generator 14.

In the embodiment shown, the generator 14—viewed looking along the main rotor axis 17—is located between the gearbox 13 and the tower 34. Due to its basic design in the form of a disk armature, the generator 14 has a generally disk-shaped construction, with two mutually facing end sides by the main rotor axis 17; the end side facing the gearbox 13 will be designated the gearbox side G and the end side facing the tower 34 the tower side T. The rotational energy is fed into the generator 14 at the gearbox side G.

The assembly 20 is integrated into a common housing, which, however, can be composed of a plurality of parts that can in particular be associated with the gearbox 13, on the one hand, and with the generator 14, on the other hand, and can, for example, be connected to one another via fastening means annularly disposed at the periphery. For this purpose, the various housing parts comprise at their outer peripheries a plurality of bores extending parallel to the main rotor axis 17, which are aligned with one another in pairs or threes, and together serve to accommodate the through-passage of screws, bolts or the like, by means of which the housing parts concerned can be connected to one another and at the same time the assembly 20, as a whole, can be undislodgeably anchored, particularly tightly screwed, to the region 36 of the support structure 29 set aside for this purpose.

The main bearing 4 is disposed in a housing region of the gearbox 13 facing the hub 22, and comprises two mutually concentric rings, the outer ring of which is integrated with the housing of the gearbox 13 and thus is connected rotationally fixedly to the nacelle/gondola 35, whereas the inner ring comprises a ring gear 16, toothed on its inner face, of the gearbox 13 configured as a planetary gearbox. To connect the hub 22, provided in the ring gear 16 is a plurality of fastening bores, for example, internally threaded blind bores, which are arranged annularly about the main rotor axis 17.

A planet gear carrier 3 of the gearbox 13 is integrated with, or non-rotatably connected to, the housing of the gearbox 13. Rotatably mounted to bearing bushings fastened to the latter is a plurality of outwardly toothed planet gears 2, which mesh with the ring gear 16 on one side and with a central, outwardly toothed sun gear 15 on the other side. The sun gear 15 is configured as hollow, thus having a central opening through which, for example, the hub 22 is accessible. Since the rotation axis of the sun gear 15 coincides with the main rotor axis 17, it is also aligned with the axis of symmetry of the hub 22 of the wind wheel 23.

The side of the gearbox facing the hub 22 is not covered by the gearbox housing, but by a ring disk that is rotationally fixedly connected to the ring gear 16; it can be configured as relatively thin, since it does not perform any essential load-bearing function, but instead serves primarily to seal off or encase the gearbox 13 with respect to the hub 22. This fairing thus rotates along with the hub 22. This also applies to a central, sleeve-shaped prolongation 1 of this fairing, which prolongation passes through the central opening in the sun gear 15 and extends, concentrically with the main rotor axis 17, from the hub-side gearbox fairing rearwardly, i.e., toward the tower 34, specifically preferably through both the gearbox 13 and the generator 14. Consequently, the sleeve-shaped prolongation 1 also rotates only at the relatively slow rotation speed of the hub 22 and thus affords the possibility of exactly determining and monitoring the hub rotation speed from inside the nacelle 35, while the hub 22 can be inspected visually while the machinery is in motion, if the wind is low, through the hollow space enclosed by the sleeve-shaped prolongation 1.

The side of the gearbox 13 facing the hub, and formed by the fairing rotating along with the ring gear 16, constitutes the input side of the gearbox, while the opposite side of the gearbox, facing the tower 34, serves as its output side. There, the sun gear 15 of the gearbox 13 protrudes through a central opening in the particular housing region integrated with the planet gear carrier 3 and extends into the adjacent region of the generator 14, in order to transmit the rotational energy from the gearbox 13 to the generator 14. In this region, the sun gear 15, which is not mounted to the sleeve-shaped prolongation 1, is mounted to the housing of the gearbox 13, or to the planet gear carrier 3 integrated therewith, or connected thereto, and/or to a local housing portion of the generator 14. Because a particular mounting of the gearbox 13 is relocated in the generator 14, or at least into the transitional region between the gearbox 13 and the generator 14, the teeth of the sun gear 15 that mesh with the planet gears 2 can extend over the entire thickness (parallel to the main rotor axis 17) of the planet gears 2.

The mounting bearing 12 of the sun gear 15 serving as the output shaft of the gearbox 13 is preferably configured as an angular contact ball bearing, for example as a double-row angular contact ball bearing, particularly as a double-row angular contact ball bearing in an O arrangement, that is, in which the contact axes of all the balls located in a common cross-sectional plane along the main rotor axis 17 form a rhombus, in contrast to the so-called X arrangement of the ball contact axes. The radially inwardly located raceways of this bearing 12 either can be disposed directly on the prolongation of the sun gear 15, particularly machined thereinto, or can be disposed in a separate inner ring of the bearing 12, which inner ring butts outwardly flush against the sun gear 15, or against its prolongation extending in the axial direction into the gearbox 13. Meanwhile, the outer ring of the bearing 12 can be braced directly against a portion of the housing of the gearbox 13 and/or generator 14. The outer ring can, for example, be screwed to the disk-shaped planet gear carrier 3 and extend from there into the generator 14. Instead of being screwed directly to the housing of the gearbox 13 or generator 14, the bearing 12 can be fixedly connected to another fixed element of the generator support.

As depicted in the drawings, the diameter of the tower-side prolongation of the sun gear 15 is smaller, in the illustrated embodiment, than the diameter of the sun gear 15 itself.

The prolongation of the sun gear 15 in the axial direction beyond the bearing 12, which prolongation thus faces the tower 34, serves to feed the rotational energy into the generator 14 and, for tapping the rotational energy, can also have at its outer radial periphery a set of teeth, or other profiling suitable for torque transmission. Non-rotatably fixed thereto is the shaft ring 10, preferably having on its inner face a profiling that is complementary to the profiling of the sun gear 15. In smaller installations, a slot and key connection can be used instead of a circumferential profiling. In any case, with the usual power ratings of professional power installations, a form-locking connection between the shaft ring 10 and the sun gear 15 is preferred over a friction-locking connection.

The shaft ring 10 can have a larger extent in the axial direction than in the radial direction, such that its shape could be described as approximately disk-like. It is penetrated in the axial direction along its periphery by a plurality of openings in which pins 9 parallel to the main rotor axis 17 are inserted and anchored. These are preferably each clad, on their regions projecting out of, or protruding from, the shaft ring 10, in a respective sleeve made of an elastic material and having, for example, a cylindrical or barrel-shaped outer circumference. These sleeves can be held in place, for example, by means of caps placed on the ends of the respective pin 9 and fastened by means of screws.

Each of these sleeves engages in a respective opening in another disk 8 that partially overlaps in the radial direction with the shaft ring 10, but has a larger outer diameter than the shaft ring 10.

This arrangement with the shaft ring 10, the pins 9, the sleeves, if any, encasing the latter, and the disk 8 offers elasticity that can provide damping of impacts, particularly in the event of jerky rotational movements, load changes or overloads, and thus furnishes some latitude, particularly with respect to higher-frequency components of the rotational movement, and consequently is intended to avert damage to the downstream portions of the installation or generator 14.

The rotational energy is relayed, via the—damped—rotational movement, from the disk 8 to the movable rotor assembly 5 of the disk armature generator 14. In the embodiment shown, the rotor assembly 5 has an approximately μ-shaped cross section, i.e., with two mutually parallel legs connected to each other by a web, but with one of the two legs extending past the web, i.e., on both sides of the web. The two mutually parallel leg ends point radially outward, whereas the third leg end extends radially inward, i.e., to the main rotor axis 17, where it can assume a course that runs parallel to the axis 17.

The two mutually parallel, radially outward pointing legs of the cross section correspond to two annular-disk-shaped regions with a groove-shaped space between them, which can accommodate magnets, preferably permanent magnets, whose magnetic fields are then linked to stator-side windings 6, 7 and induce voltages there when the rotor assembly 5 rotates about the main rotor axis 17. When a load is connected, these voltages drive a current through the windings 6, 7 and can thus be used to feed the output power, converted to electrical energy, into a power grid.

For optimal efficiency, it is important that the region of the rotor assembly 5 containing the magnets maintain constant distances, or in any case predefined distances, from the gear-side and tower-side stator windings 6, 7. This is ensured by providing a dedicated pivot bearing 11 for the approximately disk-shaped rotor assembly 5 concerned. This is a rolling bearing, for example a ball bearing, preferably an angular contact ball bearing, preferably a double-row angular contact ball bearing, particularly a double-row angular contact ball bearing of so-called O construction. The invention recommends that the balls in both or all of the rows of balls roll along at least one raceway for each row, which raceways are formed on a common ring of the bearing 11—i.e., on its inner or outer ring—that constitutes a first connection element of the particular bearing 11, whereas, depending on the embodiment, the respective other connection element of the bearing 11 can be implemented as a one-piece ring or, for example in order to increase the elasticity, can consist of a plurality of rings.

A connection element of this kind—preferably the radially outer such connection element—is preferably connected to the radially inward-pointing leg of the rotor assembly 5, and for this purpose can be provided on the outer side with a circumferential flange having one, or preferably more, fastening means arranged distributed annularly around the periphery, particularly through-openings for the through-passage of screws, pins or the like, which simultaneously also engage through respective bores aligned with them and provided in the inward-pointing leg of the rotor assembly 5, and also can engage in yet another respective bore in the disk 8, in order to connect this disk 8, the rotor assembly 5 and the outer ring of the bearing 11 rotationally and fixedly to one another.

The respective other connection element of the bearing 11—preferably the radially inner connection element—is supported by the housing of the generator 14, and is preferably rotationally fixedly anchored to the gear-side housing plate of the generator 14, for example, by means of one or preferably a plurality of screws, bolts, or the like, arranged distributed annularly over its circumference and extending parallel to the rotation axis 17.

Besides precise mounting of the cross-sectionally μ-shaped rotor assembly 5, the radially inward facing web thereof also serves to absorb the rotational energy from the disk 8 by inducing a torque. This torque induction preferably takes place by means of a form lock, which can be effected by means of the above-cited pins extending approximately parallel to the main rotor axis 17, and/or by the form-locking mutual engagement of mating profilings on the rotor assembly 5, on the one hand, and the disk 8, on the other.

As FIG. 7 shows, the inner diameter of the radially inwardly disposed ring of the rolling bearing 11 is greater by a distance B than the outer diameter of the hollow shaft 1 passing through the central opening in the output hollow shaft 15 of the gearbox 13 and rotating synchronously with the hub 22 of the wind wheel 23. Naturally, the inner diameter of the radially inwardly disposed ring of the rolling bearing 11 is also greater, by a distance C, than the outer diameter of the sun gear 15 of the gearbox 13 itself. Distance B is between 1 cm and well above 50 cm and is dependent on the overall size of the assembly 20, and naturally depends substantially on the total output of the wind energy installation 99. Distance C, as well, should be greater than 1 cm, for example greater than 5 cm, preferably greater than 15 cm, particularly greater than 50 cm or even greater than 100 cm.

Figure 6:
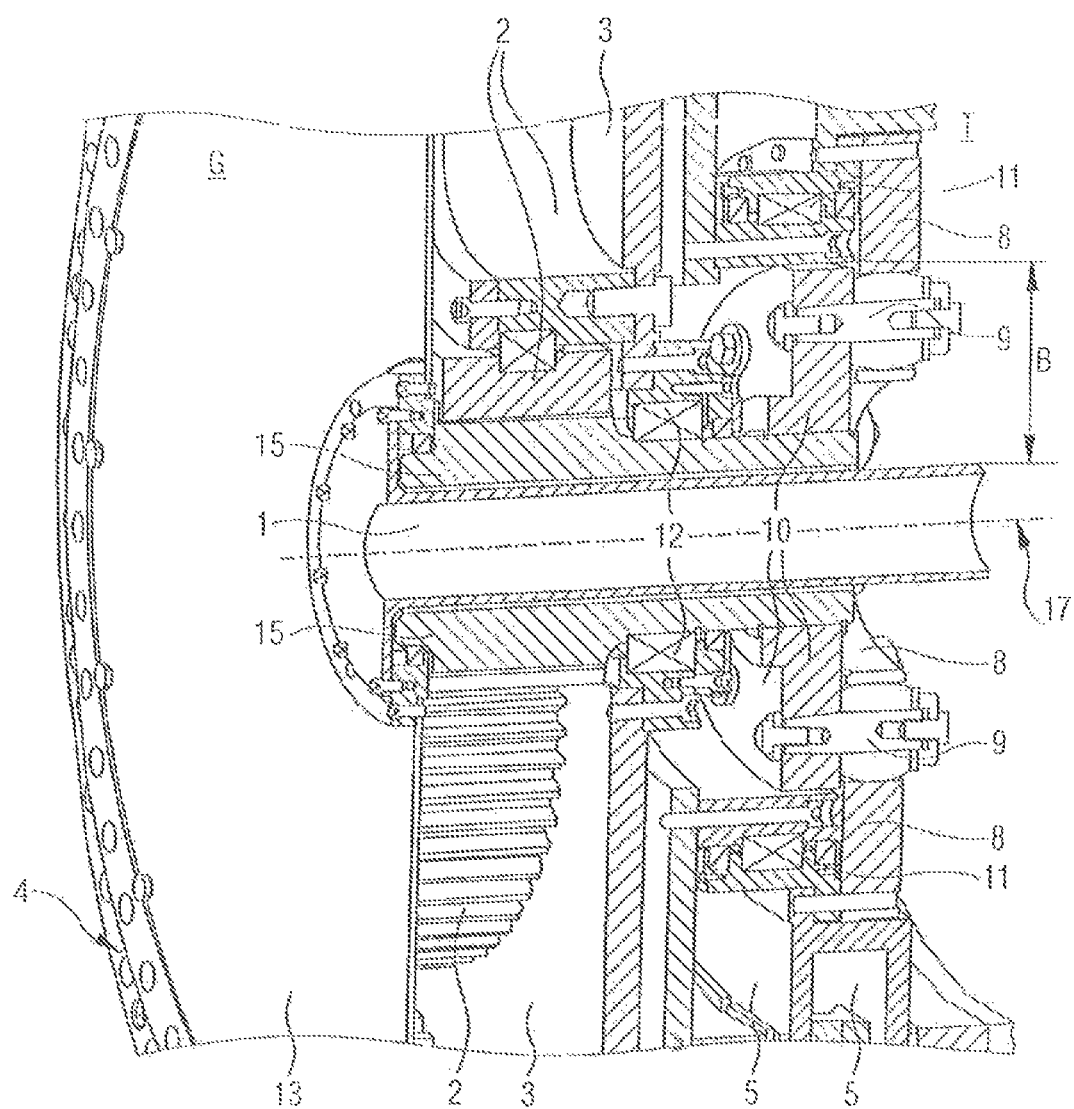
FIG. 6 is a detail view, corresponding to FIG. 5, of the overall assembly according to FIG. 3, but from another perspective.

With regard to all the bearings 11, 12, the respective air gaps can be sealed with respect to the environment by means of a seal at one, or preferably both end sides, of the bearing. This provides the additional option of filling the region of the air gap sealed in this way with a lubricant, for example grease. FIG. 6, in particular, shows sealing elements 30, which can be implemented as shaft seals, or as seals for large rolling bearings, for example made of vulcanized-rubber-like or synthetic-rubber-like materials, and/or comprising one or, where appropriate, a plurality of sealing lips, where appropriate also with lock rings, etc.

Whereas the gearbox-side stator winding 6 is anchored, for example screwed, directly to the gearbox side G of the housing of the generator 14, the tower-side stator winding 7 is connected to the tower side T of the generator by a local housing portion. This housing portion can be connected in the region of its outer periphery—or offset radially inward therefrom—to the gearbox-side housing portion via a local cylinder-jacket-shaped portion.

Although the rotational movement of the at least one ring- or disk-shaped rotor component 5 between the first and second stator components 6, 7 occurs without contact, particularly without friction, a countertorque to the braking torque from the rotor 5 develops in the stator winding, according to the principle "action=reaction," during the conversion of the rotational energy into electrical energy. The housing of the generator 14 must convey this torque developed in the stator into the support structure 29 of the tower 34 of the wind power installation 99, and for that reason must be of sufficiently robust construction and must be anchored sufficient firmly to the generator support or the support structure 29 of the tower 34 of the wind power installation 99, which can preferably be accomplished with a large number of fastening means distributed annularly about the rotation axis 17, particularly screws, bolts or the like, disposed parallel to the rotation axis 17.

Figure 4:
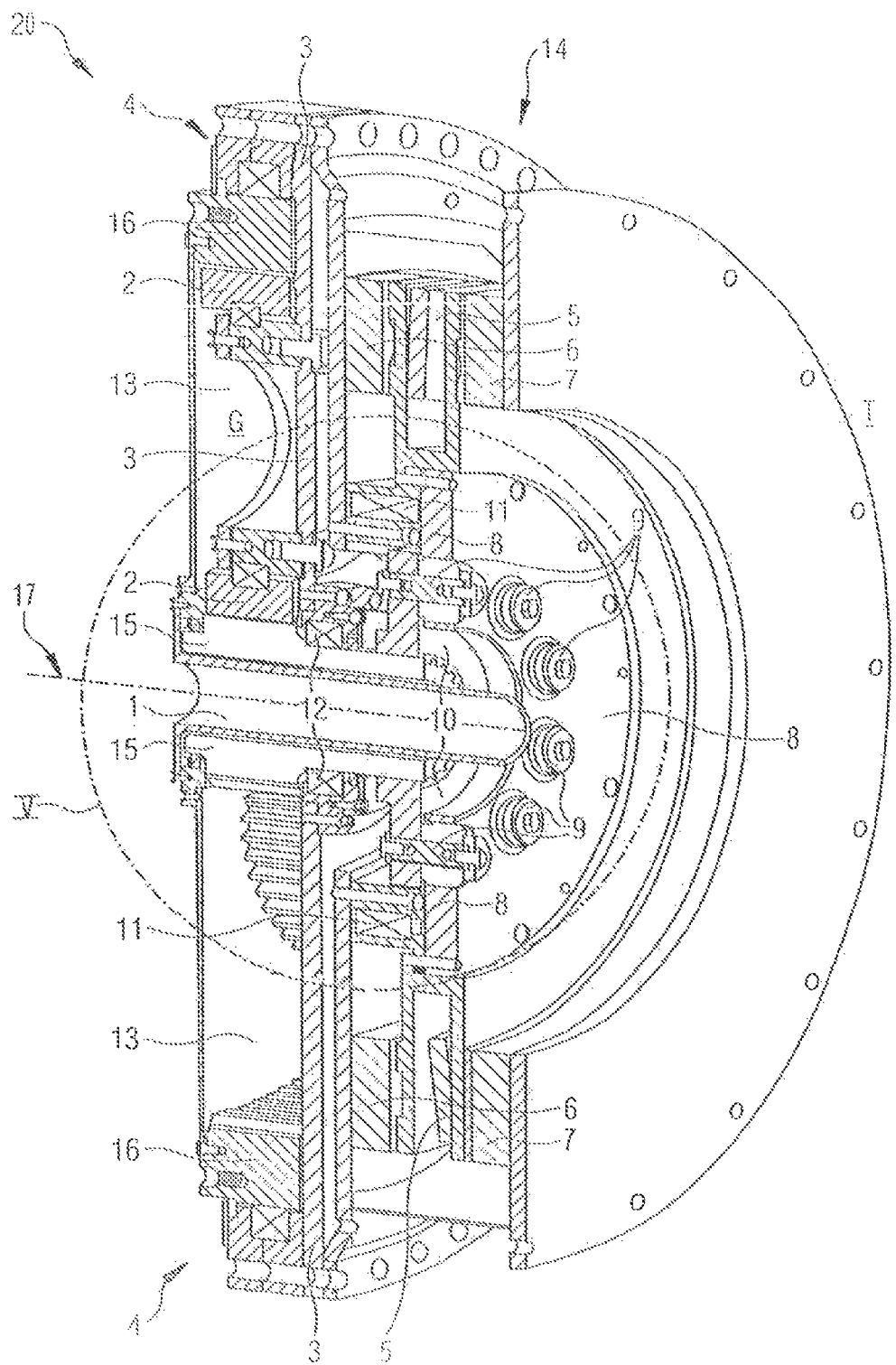
FIG. 4 shows the overall assembly according to FIG. 3, in a vertical plane along the main rotor axis, cut away and in perspective.
Figure 5:
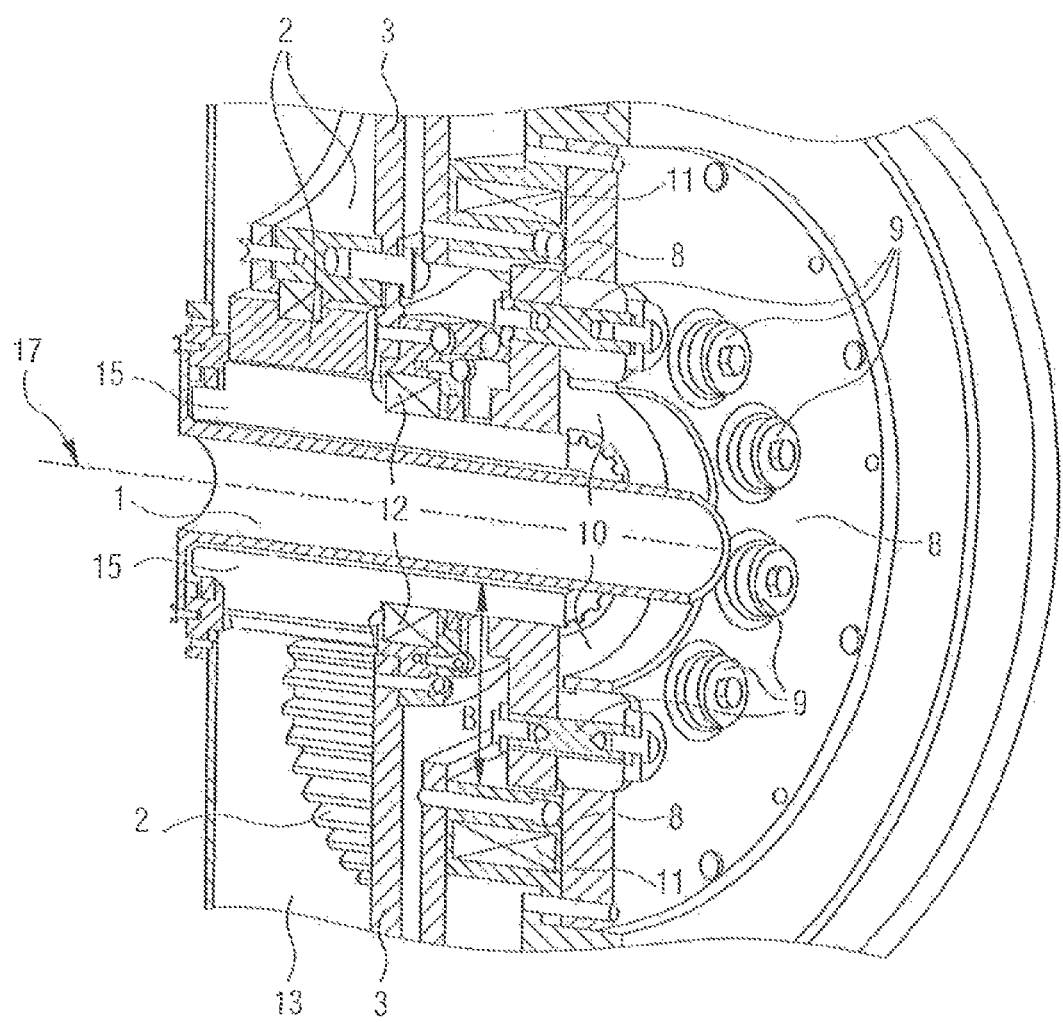
FIG. 5 is an enlarged view of detail V of FIG. 4.

It is clearly apparent from the sectional representation of FIG. 4 that the tower-side stator components 7 are attached to the tower side T via an annular housing portion of the generator 14. Due to the large central opening in this housing portion, the diameter of which can be the same as the radial inner diameter of the tower-side stator windings 7, many essential elements of the assembly 20 can be accessed from the tower side T without the need for disassembly. The tower-side elements of the invention can readily be reached by service technicians for purposes of installation, seal inspection, relubrication, maintenance, repair and other servicing, as well as for replacing components. The rotor disk can be exposed and made accessible by sequentially removing individual components from the tower side T, for example in the following order: first the tower-side housing portion of the generator 14 is removed, together with or followed by the tower-side stator portion 7; the rotor disk 5 is exposed in this way and is therefore accessible. Once the rotor disk 5 is removed, the gearbox-side rotor element 6 can also be accessed. If the latter and the gearbox-side housing portion are also removed, access is gained to the gearbox 13 located behind them.

If the rotor assembly 5 can be decoupled from the disk 8, then the latter can be removed without the need to completely disassemble the magnet and winding region of the generator 14; instead, all that has to be done is fix the rotor assembly 5 temporarily in place. Once the disk 8 is removed, there is access to the bearing 11 behind it, and also—after subsequent removal of the shaft ring 10—access to the bearing 12 for the sun gear 15 of the gearbox 13.

The pin-shaped connection elements 9 are directly accessible regardless.

In contrast to the previously described embodiment according to FIG. 1 and FIGS. 3 to 7, FIG. 2 shows a modified embodiment. Here, the electrical machine or rotor assembly 5 is mounted by means of two mutually separated bearings at spaced-apart bearing locations, with the electric rotor 5 that is to be mounted located halfway between them. For example, a respective single-row ball bearing is disposed at each of these two bearing locations, with the base planes of the bearings oriented parallel to each other but spaced apart by a length L. One of these bearings is therefore disposed at the gearbox side G and the other at the tower side T. The rotor assembly 5 of the electrical machine or the generator 14 extends between the two bearings. The bearings used for this purpose are preferably angular contact ball bearings whose contact axes converge toward each other in a radial direction—preferably radially outwardly—similarly to an O arrangement. Alternatively, an X arrangement would also naturally be conceivable in principle.

The invention claimed is:

1. A disk armature generator for generating electrical energy from rotational energy of a wind power turbine installation, wherein the disk armature generator comprises at least two stator components mutually offset axially along a generally horizontal rotation axis of the disk armature generator, and a disk armature with at least one ring- or disk-shaped rotor component which is mounted between the at least two stator components via at least one ball bearing comprising a radially inner connection element and a radially outer connection element, so as to be rotatable around the rotation axis of the disk armature generator, wherein a first one of the at least two stator components comprises a gearbox-side stator winding, wherein a second one of the at least two stator components comprises a tower-side stator winding, wherein the at least one ring- or disk-shaped rotor component comprises magnets between the gearbox-side stator winding and the tower-side stator winding, and wherein the rotor comprises an input-side connection for a planetary gearbox, wherein an output shaft of a sun gear of the planetary gearbox extends coaxially with the rotation axis of the disk armature and is coupled to the at least one ring- or disk-shaped rotor component of the disk armature, wherein the at least one ball bearing associated with the at least one ring- or disk-shaped rotor component of the disk armature is configured as a double-row angular contact ball bearing with two rows of balls having a contact angle of between 40° and 50° relative to the rotation axis of the disk armature generator, which double row angular contact ball bearing is supported by a housing of the generator, wherein the balls in both rows of balls roll along a respective raceway for each row, which raceways are formed on a common ring of the double-row angular contact ball bearing, which common ring of the double-row angular contact ball bearing with its both raceways is penetrated by the output shaft of the sun gear of the planetary gearbox, wherein the output shaft of the sun gear of the planetary gearbox is coupled to the at least one ring- or disk-shaped rotor component of the disk armature at a place beyond the ball bearing, and the output shaft of the sun gear of the planetary gearbox extends through the ball bearing, wherein the coupling between the output shaft of the sun gear of the planetary gearbox and the at least one ring- or disk-shaped rotor component of the at least one disk armature is implemented by means of at least one device for elastic force transmission arranged inside the generator rotatably about the rotation axis of the disk armature generator, wherein the device for elastic force transmission comprises at least two rotating elements, at least one of which comprises a shaft ring or a coupling disc.

2. The disk armature generator in accordance with claim 1, wherein a minimum inner diameter of the at least one ball bearing associated with the at least one ring- or disk-shaped rotor component of the disk armature is a radial distance from an outer diameter of the output shaft of the sun gear of the planetary gearbox.

3. The disk armature generator in accordance with claim 2, wherein the distance between the minimum inner diameter of the at least one ball bearing and the outer diameter of the output shaft of the sun gear of the planetary gearbox is 5 cm or more.

4. The disk armature generator in accordance with claim 1, wherein the two rotating elements are rotationally fixedly coupled to each other by means of at least one connection element.

5. The disk armature generator in accordance with claim 4, wherein the at least one connection element for coupling the two rotating elements comprises at least one elongated coupling element oriented parallel to the rotation axis of the disk armature generator.

6. The disk armature generator in accordance with claim 5, wherein the at least one elongated coupling element comprises an elastic material selected from an elastomer-like, vulcanized-rubber-like, or synthetic-rubber-like, material.

7. The disk armature generator in accordance with claim 5, wherein the at least one connection element is one of a plurality of elongated coupling elements, and the plurality of elongated coupling elements are distributed annularly about the rotation axis of the disk armature generator.

8. The disk armature generator in accordance with claim 1, wherein the output shaft of the sun gear of the planetary gearbox is mounted by at least one rolling bearing at the housing of the generator, and/or at a housing of the planetary gearbox, wherein the at least one rolling bearing is disposed between the output shaft of the sun gear of the planetary gearbox and the at least one ring- or disk-shaped rotor component of the disk armature.

9. The disk armature generator in accordance with claim 8, wherein the output shaft of the sun gear of the planetary gearbox is surrounded externally by an inner ring of the rolling bearing of the sun gear of the planetary gearbox, while an outer ring of said rolling bearing is surrounded externally by the housing of the generator and/or by the housing of the planetary gearbox.

10. The disk armature generator according to claim 1, wherein the radially outer connection element of the at least one ball bearing is connected to the at least one ring- or disk-shaped rotor component, while the radially inner connection element of the at least one ball bearing is supported by a housing of the generator.

11. The disk armature generator according to claim 1, wherein the at least one ball bearing associated with the at least one ring- or disk-shaped rotor component of the disk armature is penetrated by the output shaft of the sun gear of the planetary gearbox, and wherein a minimum inner diameter of the at least one ball bearing associated with the at least one ring- or disk-shaped rotor component of the disk armature is a radial distance of 1 cm or more from an outer diameter of the output shaft of the sun gear of the planetary gearbox.

12. A disk armature generator for generating electrical energy from rotational energy of a wind power turbine installation, wherein the disk armature generator comprises at least two stator components mutually offset axially along a generally horizontal rotation axis of the disk armature generator, and a disk armature with at least one ring- or disk-shaped rotor component which is mounted between the at least two stator components via at least one ball bearing comprising a radially inner connection element and a radially outer connection element, so as to be rotatable around the rotation axis of the disk armature generator, wherein a first one of the at least two stator components comprises a gearbox-side stator winding, wherein a second one of the at least two stator components comprises a tower-side stator winding, wherein the at least one ring- or disk-shaped rotor component comprises magnets between the gearbox-side stator winding and the tower-side stator winding, and wherein the rotor comprises an input-side connection for a planetary gearbox, wherein an output shaft of a sun gear of the planetary gearbox extends coaxially with the rotation axis of the disk armature and is coupled to the at least one ring- or disk-shaped rotor component of the disk armature, wherein the at least one ball bearing associated with the at least one ring- or disk-shaped rotor component of the disk armature is configured as a double-row angular contact ball bearing with two rows of balls having a contact angle of between 40° and 50° relative to the rotation axis of the disk armature generator, which double row angular contact ball bearing is supported by a housing of the generator, wherein the balls in both rows of balls roll along a respective raceway for each row, which raceways are formed on a common ring of the double-row angular contact ball bearing, which common ring of the double-row angular contact ball bearing with its both raceways is penetrated by the output shaft of the sun gear of the planetary gearbox, and wherein the coupling between the output shaft of the sun gear of the planetary gearbox and the at least one ring- or disk-shaped rotor component of the at least one disk armature is implemented by means of at least one device for elastic force transmission arranged inside the generator rotatably around the rotation axis of the disk armature generator, which device for elastic force transmission comprises at least two rotating elements, which rotating elements are rotationally fixedly coupled to each other by means of at least one elongated coupling element oriented parallel to the rotation axis of the generator and comprising an elastic material.

* * * * *